March 19, 1963   J. W. ANDERSON   3,082,026
WINDSHIELD WIPER ARM
Filed June 25, 1958

INVENTOR.
JOHN W. ANDERSON
BY
W. E. Recktenwald
ATTORNEY

3,082,026
WINDSHIELD WIPER ARM
John W. Anderson, 578 Broadway, Gary, Ind.
Filed June 25, 1958, Ser. No. 744,459
6 Claims. (Cl. 287—53)

This invention relates generally to windshield wiper arms and particularly to improvements for detachably connecting an arm to a shaft.

The invention is adapted for use with a wiper arm assembly comprising an inner shaft-receiving section, a wiper blade supporting arm pivotally connected to the inner section, and a spring for urging the arm and wiper blade toward a windshield.

The primary object of the invention is to provide the inner shaft-receiving section of the arm assembly with a novel resilient retaining or latching member for engaging a shoulder or abutment on a shaft for retaining the arm assembled on the shaft. The arrangement is preferably such that the latching member offers sufficient restraining force to prevent accidental movement of the arm relative to the shaft particularly in an axial direction.

An important object of this invention is to provide an arm assembly in which the resilient latching element is supported on the inner shaft-receiving section of the arm assembly.

A further object of this invention is to provide an improved latch member for connecting the inner shaft-receiving portion of an arm to a mating portion of a drive shaft.

And a further object of this invention is to provide an improved means for securing the resilient latch member to the inner shaft-receiving section of the arm.

A particular object of this invention is to provide an arm construction having the outer arm portion pivotally secured to the inner shaft-receiving portion in a simple and efficient manner.

And a still further object of this invention is to provide an improved arm construction which can be removed from a drive shaft in a relatively simple manner.

Another object of this invention is to provide an arm construction in which the outer arm portion includes an intermediate channel section pivotally secured to the inner shaft-receiving section, an extended bar section mounted in the channel section and a spring arrangement for pivotally urging the channel section and bar section as a unit toward a windshield about the inner shaft-receiving section.

Another object of this invention is to provide an inner shaft-receiving portion which may be die-cast in one piece with a minimum of protrusions or complex shapes included therein.

And another object of this invention is to provide an improved arm construction that is highly efficient in use, is simple to manufacture and repair, having few operating parts, and is relatively inexpensive to produce.

Other objects and advantages of the invention will appear after the description hereinafter set forth is considered in conjunction with the drawings annexed hereto.

In the drawings where like parts are identified by the same reference numerals:

Figure 1:
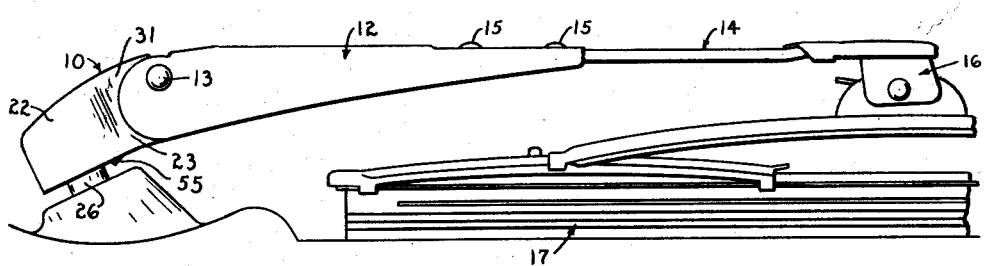
FIGURE 1 is a side elevation of a portion of the improved windshield wiper arm as attached to a drive shaft.

The arm assembly above referred to generally includes, among other things, an inner shaft-receiving section 10, an intermediate channel section 12 pivotally connected to the inner shaft-receiving section 10 by means of a cross pin or rivet 13; an extension bar section 14 riveted to inner channel section 12 by means of rivets 15; a connector 16 carried by the free end of the bar section 14 for supporting a wiper blade 17; a retainer member 18 carried by the inner shaft-receiving section 10; and an elongated helical spring 19 connected through a link 20 to a pin 21 in the inner shaft-receiving section 10 and connected at its opposite end to a remote part of the channel section 12 for urging the channel and bar sections toward a windshield. The channel section 12, the bar section 14, the connector 16 and blade 17 are of conventional construction and are shown for illustration purposes only, it being understood that any outer arm sections, connector and blade could be incorporated equally as effectively as that illustrated.

Figure 2:
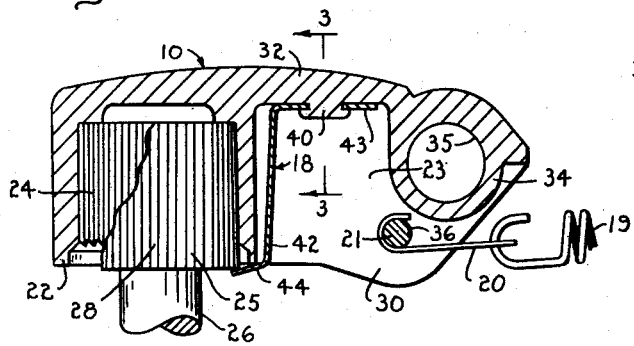
FIGURE 2 is an enlarged sectional view of the inner shaft-receiving portion of the arm illustrating one form of my invention.
Figure 3:
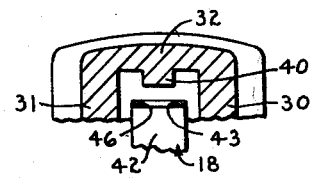
FIGURE 3 is a cross-sectional view taken on the lines 3—3 of FIGURE 2 prior to the swedging over of the anchor element.
Figure 6:
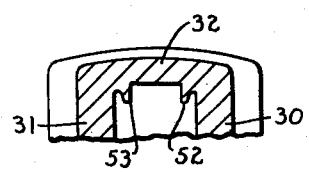
FIGURE 6 is a cross-sectional view taken on the lines 6—6 of FIGURE 5 prior to the swedging over of the anchor element.
Figure 4:
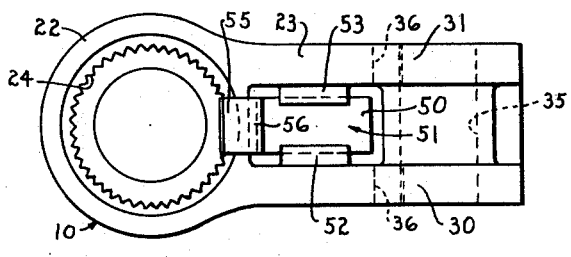
FIGURE 4 is a bottom view of a modified form of my invention illustrating the inner shaft-receiving portion of the arm.
Figure 7:
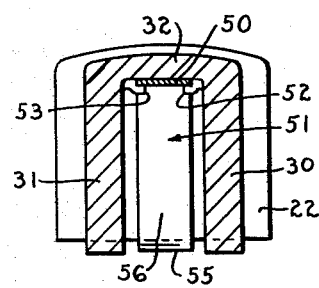
FIGURE 7 is a cross-sectional view taken on the lines 7—7 of FIGURE 5.
Figure 5:
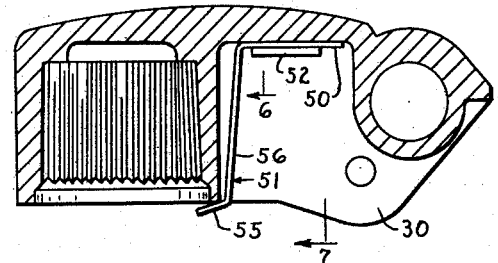
FIGURE 5 is a view similar to FIGURE 2 showing the modified form of FIGURE 4.

The shaft-receiving section 10 of the wiper arm assembly and the retainer member 18 associated therewith are illustrated in the preferred form in FIGURES 1 through 3. The inner shaft-receiving section 10 is preferably die-cast in one piece and comprises a cylindrical socket portion 22 and a recessed or channel-shaped attaching portion 23. The socket portion 22 is open on one side in communication with a cylindrically shaped cavity which has serrations or flutings 24 formed therein along lines substantially parallel to the axis of the cavity. The socket portion 22 is adapted to interfit with a serrated or fluted drum member 25 carried on a drive shaft 26 of a wiper system. The drum member 25 may be a separate part secured to the shaft or it may be formed as an integral part of the shaft. The periphery of the drum is provided with relatively fine longitudinal serrations or flutings 28, the majority of which intimately engage with the serrations or flutings 24 on the inner cylindrical wall of the socket when the inner shaft-receiving section 10 is pressed onto the drum.

Integrally formed with the cylindrical socket portion 22 is the radially disposed channel-shaped attaching portion 23 comprising a pair of spaced-apart parallel side walls 30, 31 which merge with a common bottom wall 32. The wall 32 extends over and closes one end of the socket so as to produce a smoothly appearing continuous inner shaft section. Integrally formed with the wall 32 and extending between the parallel side walls 30, 31, is a sleeve 34 having an aperture 35 passing therethrough in which is seated a bearing (not shown) for the pivot pin 13 of the intermediate channel section 12 for pivotally securing the inner shaft-receiving section 10 to the intermediate channel section 12. A pair of aligned apertures 36 are formed in the parallel walls 30, 31 for receiving the pin 21 for anchoring the one end of the spring mounting hook 20 which is connected to the tensioning spring 19 of the arm.

The retainer member 18 is operatively positioned in the recessed channel-shaped attaching portion 23 of the inner shaft-receiving section 10 and for this purpose a lug 40 is die-cast integrally with the wall 32 and extends inwardly between and in spaced relation with the side walls 30, 31.

The retainer member 18 is preferably formed from spring-type material and is comprised of a body portion 42, an anchoring portion 43 and a latch portion 44. The anchoring portion 43 and latch portion 44 are integrally formed on opposite ends of the body portion 42 and are shaped with respect to the body portion at an angle slightly greater than ninety degrees. The anchoring portion 43 has an aperture 46 adapted to seat over the lug 40 with the side edges of the portion 43 spaced slightly inward from the walls 30, 31. The lug 40 is peened, swedged or riveted over so as to securely fasten the retainer member 18 in the inner shaft section 10. The distance from the aperture 46 in the portion 43 and the bend between the portion 43 and body portion 42 is less than the distance from the lug 40 and the wall of the socket 22 such that the body portion 42 will be positioned in spaced relationship with respect to the wall of the socket 22. The body portion 42 is of such a length that with the upper face of the anchoring portion 43 seated against the inner face of the wall 32, an intermediate area of the latch portion 44 of the retainer member 18 will engage the peripheral lip edge of the socket 22 so as to provide a cantilever support for the operative outer end portion 46 of the latch 44. The outer end portion 46 of the latch 44 is extended into overhanging relation with the open socket 22 such as to prevent ready access to or egress from the socket portion 22 in an axial direction.

The inner shaft-receiving section 10 is assembled on the enlarged serrated drum 25 on the shaft 26 by contacting the outer end portions of the serrations on the drum with the end of the latch portion 44 and moving the arm in a direction to depress the retainer member 18 relative to the opening in the socket. When the serrations on the drum 25 and in the socket 22 are properly aligned, the shaft section 10 is moved axially with respect to the drum until the latch portion 44 of the retainer member 18 is snapped under the lower edge of the drum by the resiliency of the member 18. The matching serrations on the drum and socket create a locked condition therebetween that results in a positive driving connection between the shaft 26 and the wiper arm. The retainer member 18 holds the shaft section 10 assembled on the drum. The shaft section is removed from the drum by the application of sufficient axial force on the shaft section relative to the drum whereupon the edge of the drum cams the latch portion 44 and body portion 42 toward the blade end of the arm and away from the axis of the drum so as to permit the shaft section 10 to be moved axial of the drum. The body portion 42 of the retainer member 18 is spaced away from the outer cylindrical surface of the socket 22 throughout its length so as to permit the full lever-type spring action of the retainer member 18 to act on the latch portion 44 of the member 18 for holding the latch portion 44 operatively associated with the shoulder on the drum for retaining the arm assembled on the shaft.

In the modified form of my invention shown in FIGURES 4 through 7, the inner shaft-receiving section 10 is substantially the same as the inner shaft-receiving section of the form shown in FIGURES 2 and 3 and has socket 22, the wall 32, parallel walls 30, 31, sleeve 34, pins 13 and 20 and spring 19. The primary difference lies in the anchoring portion 50 of the retainer member 51 and the means for attaching said member to the shaft section 10. The means for attaching the member to the shaft section 10 comprises a pair of elongate downwardly extending fingers 52, 53 laterally spaced apart from each other and lying in relatively close proximity to the side walls of the shaft section 10. The retainer member 51 has the anchoring portion 50 and a latch portion 55 extending in opposite directions from the opposite end portions of the body portion 56 thereof at an angle slightly larger than ninety degrees. In this form of retainer member, no apertures are formed in the attaching portion thereof so that with the attaching portion 50 positioned beween the depending fingers 52, 53 in the inner shaft-receiving section 10, it is a simple swedging operation to bend or deform the depending fingers into overlapping relationship with respect to said attaching portion 50 of the lever member, best shown in FIGURE 7, for securing said retainer member 51 in operative relationship with respect to the inner shaft-receiving section. Notches, not shown, could be formed in the edges of the anchoring portion 50 so that the swedging over of the fingers 52, 53 will seat in the notches to positively position the retainer member 51 in position in the shaft section 10.

The body portion 56 of the retainer member is positioned away from the outer cylindrical wall of the socket 22 so as to create a full cantilever action on the latch portion 55 of the retainer member lying in overlapping relationship with respect to the mouth of the socket. The body portion 56 and latch portion 55 of the retainer member are positioned in the shaft section 10 and function in substantially the same manner as the retainer member 18 in FIGURES 2 and 3, and a description thereof will not be repeated at this time.

The retainer members 18 and 51 of both modifications of my invention are extremely simple in their construction and operation and are assembled with the inner shaft-receiving section in an efficient manner. The retainer members are not retained under great compressive or tensile loads during the normal retaining function thereof so that ruptures or failures due to prolonged loading of the members are reduced to a minimum. The retainer member has the further advantage of permitting rapid and efficient assembly of the arm with a shaft or removal from the shaft without the use of wrenches or other tools to tighten the arm to the shaft.

While I have shown and described my invention in connection with certain specified embodiments, it will, of course, be understood that I do not wish to be limited thereto since it is apparent that modifications may be made in such embodiment and the materials thereof without departing from the spirit and scope of my invention as set forth in the appended claims.

I claim:

1. A wiper arm fitting having walls defining a shaft-receiving socket and a channel-shaped chamber opening side by side with said socket through one face of said arm,
    and a retaining member disposed substantially in said chamber and having a body portion, an anchoring portion, and a latch portion,
    said latch portion overhanging a wall of the socket for engaging an actuating shaft,
    said body portion being disposed in spaced relationship with a wall common to said socket and said chamber and yieldably supporting the latch portion,
    a wall of the chamber having deformable means adapted to be deformed over a part of the anchoring portion to hold said retaining member against displacement from the chamber.

2. A wiper arm having a shaft-receiving socket and an adjacent channel-shaped chamber opening each being disposed side by side through one face thereof,
    said arm also having a wall common to said socket and said chamber and said chamber having a bottom wall,
    a retaining member disposed substantially in said chamber and having a body portion, an anchoring portion provided with an aperture, and a latch portion,
    said latch portion overhanging said common wall of the socket for engaging an entering part adapted for disposition in said socket,
    said body portion being disposed in spaced relationship to said common wall and yieldably supporting the latch portion,
    and means formed integral with said bottom wall of the chamber extending axially through said aperture in said anchoring portion and having an end deformed against the latter to hold said retaining member against displacement from the chamber.

3. A wiper arm having a shaft-receiving socket and a channel-shaped recess adjacent thereto with a wall common to said socket and recess, said recess having spaced-apart side walls integral with the walls of said socket, said recess and said socket having openings accessible from the same side of said arm, and a retaining member disposed in said recess and having a flexible body portion integrally formed with an anchoring portion and a latch portion, said latch portion overhanging the socket for engaging a driving member carried by an actuating shaft, said body portion being disposed in movable relationship to said common wall, said body portion yieldably supporting the latch portion, a connecting wall joining said side walls of the recess and deformable lug means carried by the connecting wall of the recess, said lug means being in engagement with the anchoring portion and deformable to engage said anchoring portion of said retaining member to hold said retaining member against displacement from the recess.

4. A wiper arm having a shaft-receiving socket and a channel-shaped recess adjacent thereto with a wall common to said socket and said recess, said recess having spaced-apart side walls integral with the walls of said socket and a bottom wall connecting said side walls, said recess and said socket having openings accessible from the same side of said arm, a retaining member having a flexible body portion integrally formed with an anchoring portion terminating adjacent the bottom wall, said retaining member having a latch portion, said latch portion overhanging the opening in the socket for engaging a driving member carried by an actuating shaft, said body portion yieldingly supporting the latch portion and being disposed in movable relationship with said common wall, and deformable fastening means carried by the bottom wall of the recess in engagement with the anchoring portion, said fastening means being deformable to engage said anchoring portion of said retaining member to hold said retaining member against displacement from the recess.

5. A wiper arm having a shaft-receiving socket and an adjacent recess with a common wall therebetween, and a retaining member including a resilient body portion and an anchoring portion and a latch portion, said anchoring portion of said retaining member terminating adjacent a wall portion of said recess, deformable means integral with said wall portion of said recess and disposed adjacent said anchoring portion and deformed into engagement with said anchoring portion for positioning said body portion in said recess, a portion of said latch portion overhanging said common wall and shaft-receiving socket for engaging an actuating shaft receivable in said socket.

6. A wiper arm having a shaft-receiving socket and a channel-shaped recess adjacent thereto; said recess having spaced-apart side walls integral with the walls of said socket; a bottom wall connecting said side walls, said recess and said socket having openings accessible from the same side of said arm; a retaining member having a flexible body portion, an anchoring portion, and a latch portion; said latch portion overhanging the opening in the socket for engaging a driving member carried by an actuating shaft, said body portion yieldably supporting said latch portion and being disposed in movable relationship with a wall common to said socket and said recess, and deformable lug means carried by the bottom wall of the recess in engagement with the anchoring portion of said retaining member whereby peening said lug means will hold said retaining member against displacement from the recess.

References Cited in the file of this patent

UNITED STATES PATENTS

| | | |
|---|---|---|
| 208,837 | Miller | Oct. 8, 1878 |
| 2,564,819 | Shieberl | Aug. 21, 1951 |
| 2,599,407 | Miller | June 3, 1952 |
| 2,715,238 | Krohm | Aug. 16, 1955 |
| 2,781,540 | Deibel | Feb. 19, 1957 |
| 2,832,982 | Parkes | May 6, 1958 |